United States Patent Office 3,026,713
Patented Mar. 27, 1962

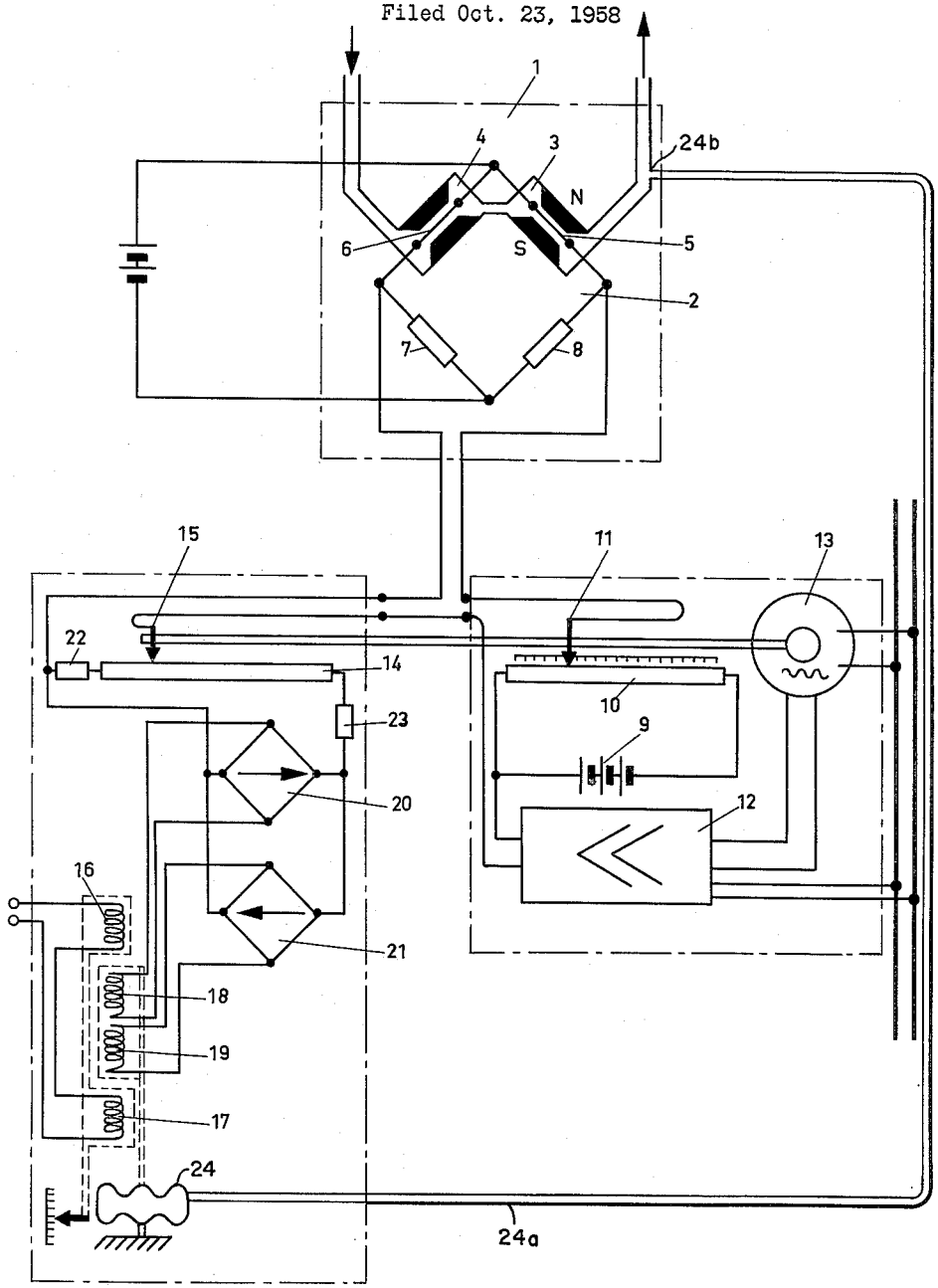

3,026,713
APPARATUS FOR THE ANALYSIS OF GASES
Stefan Block, Offenbach am Main, and Hans Georg Schlenz, Frankfurt am Main Praunheim, Germany, assignors to Hartmann & Braun Aktiengesellschaft, Frankfurt am Main, Germany, a corporation of Germany
Filed Oct. 23, 1958, Ser. No. 769,147
Claims priority, application Germany Nov. 2, 1957
3 Claims. (Cl. 73—27)

This invention relates to gas analysers based on a physical principle such as gas analysers making use of thermomagnetic effects in certain gas components and which are known in general as magnetic oxygen analysers, or gas analysers utilizing the different thermal conductivity of the gas components for the analysis, or analysers based on the absorption of infrared radiation. The indication of almost all these analysers depends on the pressure existing in the test gas. If the test gas in the measuring cell of the analyser is exposed to atmospheric pressure it enters into the measurement. The measurement can only be correct at one definite atmospheric pressure and therefore fluctuations of the existing pressure result in an error of measurement. The main object of the invention is therefore to create a suitable correction device for the above types of gas analysers so that the measuring result is independent from the pressure of the test gas in order to ensure that a correct indication is always obtained irrespective of the pressure of the test gas. The error of indication of gas analysers based on a physical principle produced by pressure fluctuations of the test gas is not only proportionate to the momentary pressure of the test gas but depends furthermore on the concentration of the component to be analysed. A high concentration of the component to be measured in the test gas results in a larger error due to a certain pressure fluctuation than with a low concentration of this component. The error produced due to pressure fluctuations of the test gas is composed multiplicatively of the magnitude of pressure fluctuation and the concentration of the component to be analyzed in the test gas. The gas analysers known so far are generally confined to the formation of a correction value being direct proportionate to the existing pressure and which enters the measurement. This method enables a perfect correction of the measurement only for a certain rate of concentration of the component to be measured in the test gas, that means a perfect correction of the errors due to pressure fluctuations was only possible at one scale point of the indicator connected to the analyser, whereas errors occurred at all other scale points. It is therefore, a further object of the invention to provide for a correction device for the above types of gas analysers enabling that at all occurring pressure fluctuations and concentrations of the component to be measure in the test gas a correct indication is obtained for all scale points of the indicator.

Details of the invention are explained by the FIGURE which shows as example a gas analyser utilizing the thermomagnetic effect of certain gases, especially of oxygen, for the analysis. Apparatuses of this type are generally termed magnetic oxygen testers. However the invention also relates to gas analysers based on other principles.

In the figure the magnetic oxygen analyser is designated with 1 and the heating wires of same with 2. One of the two heating wires 5 is arranged in measuring cell 3 and is surrounded by an inhomogenous magnetic field produced by pole pieces S, N. The other heating wire 6 is arranged in the reference cell 4 free from magnetic fields, the inner dimensions and shape of this cell corresponding to a high extent to measuring cell 3. The measuring cell and reference cell are connected with each other. Due to the oxygen contained in the test gas the heating wire 5 arranged in the inhomogenous field is cooled more than the heating wire 5 disposed in a space without magnetic field. This results in an unbalance of heating wire bridge 2 consisting of heating wires 5 and 6 and comparison resistors 7 and 8. A diagonal voltage depending on the oxygen content in the test gas is produced between the corner points of the zero diagonal. To this diagonal voltage a corresponding voltage is counter-connected across potentiometer 10 with slide wire 11 fed by constant voltage source 9. By means of zero current amplifier 12 with connected zero motor 13 the counter-voltage tapped off the potentiometer 10 is adjusted such that the measuring voltage between the bridge corner points of the diagonal is compensated to zero. The position of slider 11 of the slide wire potentiometer 10 then represents a measure for the voltage of the bridge diagonal and thus of the content of oxygen to be measured in the test gas. In order to render ineffective any pressure fluctuations of the test gas which might influence the measurement of oxygen concentration, the invention provides for adding a voltage to the voltage of the bridge diagonal independent from the existing pressure and the deflection of the indicator. This correction voltage is tapped off as voltage drop from potentiometer resistor 14 disposed in an auxiliary circuit. This auxiliary circuit is fed by a converter yielding an electric output as a function of the pressure. This converter consists of two coils 16 and 17 disposed in a definite distance from each other and connected in series, said coils being connected to an A.C. current source. Coils 16 and 17 are assembled on a common adjustable support. Between coils 16 and 17 there are coils 18 and 19 which are also fixed to a common adjustable support. The support of coils 18 and 19 is adjustable and connected mechanically to bellows means 24 connected by a conduit 24a to tap the test gas stream, say, as at 24b so that pressure variations of the test gas shift the coils 18 and 19. If compensation is for changes in atmospheric pressure and the test gas is at pressures substantially those of the atmosphere the conduit 24a may be omitted. Since this reverses the response of the bellows means, corresponding reversal, say, of the polarity of rectifiers 20 and 21 is required. The currents induced in coils 18 and 19 are rectified by means of rectifiers 20 and 21 and counter-connected. The differential values of the output currents are applied to potentiometer resistance 14 via adjustable resistors 22 and 23. In the middle position, i.e. symmetrical position of the two coils 18 and 19 the induced currents rectified by means of rectifiers 20 and 21 are equal. One of the two currents increases when removing coils 18 and 19 from the middle position by means of pressure transmitter 24. Therefore potentiometer 14 is fed with a current depending from the existing pressure. Now the voltage drop at resistor 14 is not counter-connected direct to the diagonal voltage of bridge 2. On resistor 14 a sliding contact is arranged which enables to vary the tapped off portion of the resistor through which the pressure-depending current is flowing. Sliding contact 15 is coupled mechanically to adjusting element 11 of the compensation measuring equipment. The relative position of both sliding contacts 11 and 15 as well as the compensation resistors 22 and 23 are adjusted preferably in such a manner that in the case of instruments without suppressed initial range, i.e. with a scale starting with 0%, the voltage drop tapped off the resistor 14 by means of element 15 becomes zero at the zero point of the scale. In this case the resistance 22 is to be omitted. Instruments with suppressed initial range, i.e. the scale of the indicator not starting with 0%, either provide for mutual adjustment of both sliding contacts 11 and 15 or resistance 22 is rated accordingly so that the tapped off portion of the voltage drop is adjusted at potentiometer 14 for obtaining already at the scale beginning of the indicator a finite value differing from zero corresponding to the value to be corrected. The sensitivity of the correction device or the relation of the correction value from the existing pressure can be adjusted by means of resistance 23. By rating accordingly the tapping resistance 14 an automatic compensation of the measuring errors due to pressure fluctuations is achieved at any point of the total measuring range. In case of a non-linear relation between the measuring value and the correction value to be connected an accurate pressure correction within the total measuring range is achieved by selecting a non-linear characteristic of resistor 14.

On principle the device for correcting measuring errors due to pressure fluctuations as shown in the example of a magnetic oxygen analyser is applicable for all gas analysers based on a physical principle.

We claim:

1. A device for the analysis of gases containing variable amounts of oxygen and subject to total pressure variation, said device comprising a bridge circuit including a pair of heater wires in adjacent arms of the bridge; test and comparison gas chambers for the respective wires; a magnet in the test chamber; resistance elements in opposite adjacent arms of the bridge; a constant supply of current for the bridge connected to one diagonal of the bridge; two ganged potentiometers each having resistors with two end terminals and a slide tap; means for supplying a potential difference variable with the total pressure of the test gas to the end terminals of one resistor; a source of substantially constant potential difference connected to the terminal ends of the other potentiometer; a take-off circuit connected to the points of the other diagonal and including the respective portions of the two potentiometer resistors between an end terminal and the slide tap and an amplifier at the input thereof, for varying the input to the amplifier to correct for errors due to differences in partial pressure of oxygen with respect to total pressure during fluctuations of the latter and, motor means connected to the output of the amplifier for moving the slide taps to null position.

2. A device for the analysis of gases containing variable amounts of a specific gaseous component and subject to total pressure variation and wherein an aspect of the component varies with the pressure of the gas and non-linearly with respect to the partial pressure of the component, said device comprising a bridge circuit including a pair of heater wires in adjacent arms of the bridge; test and comparison gas chambers for the respective wires; resistance elements in opposite adjacent arms of the bridge; a constant supply of current for the bridge connected to one diagonal of the bridge; two ganged potentiometers each having resistors with two end terminals and a slide tap; means for supplying a potential difference variable with the total pressure of the test gas to the end terminals of one resistor; a source of substantially constant potential difference connected to the terminal ends of the other potentiometer, a take-off circuit connected to the points of the other diagonal and including, serially, the respective portions of the two potentiometer resistors between an end terminal and the slide tap, and an amplifier at the input thereof, and, motor means connected to the output of the amplifier for moving the slide taps to null position, null position of a slide tap with respect to the resistor associated therewith being an indication of the content of the component in the test gas.

3. A device for the analysis of gases containing variable amounts of oxygen subject to total pressure variation, said device comprising a bridge circuit including a pair of heater wires in adjacent arms of the bridge; test and comparison gas chambers for the respective wires; a magnet in the test chamber; resistance elements in opposite adjacent arms of the bridge; a constant supply of current for the bridge connected to one diagonal of the bridge; two ganged potentiometers each having resistors with two end terminals and a slide tap; means for supplying a potential difference variable with the total pressure of the test gas to the end terminals of one resistor, a source of substantially constant potential difference connected to the terminal ends of the other potentiometer, a take-off circuit connected to the points of the other diagonal and including, serially, the respective portions of the two potentiometer resistors between an end terminal of the slide tap, and, an amplifier at the input thereof, and motor means connected to the output of the amplifier for moving the slide taps to null position.

References Cited in the file of this patent

UNITED STATES PATENTS

| 2,763,151 | Richardson | Sept. 18, 1956 |
| 2,815,659 | Krupp | Dec. 10, 1957 |
| 2,986,935 | Cupido et al. | June 6, 1961 |

OTHER REFERENCES

Publication, Instruments, vol. 26, February 1953, article by Riggs, pages 280 thru 284. (Copy in 73–27.5.)

Journal of Scientific Instruments, vol. 33, May 1956, article by Hobson Kay, pages 176–180. (Copy in 73–27.5.)